United States Patent [19]

Poetsch et al.

[11] Patent Number: 4,513,324
[45] Date of Patent: Apr. 23, 1985

[54] TELEVISION SCANNING OF WIDE FRAME MOTION PICTURE FILMS

[75] Inventors: Dieter Poetsch, Ober-Ramstadt; Volker Massmann, Mühltal; Werner Becker, Mainz; Horst Wagner, Griesheim, all of Fed. Rep. of Germany

[73] Assignee: Robert Bosch GmbH, Stuttgart, Fed. Rep. of Germany

[21] Appl. No.: 434,054

[22] Filed: Oct. 13, 1982

[30] Foreign Application Priority Data

Oct. 29, 1981 [DE] Fed. Rep. of Germany ....... 3142865

[51] Int. Cl.³ .............................................. H04N 3/36
[52] U.S. Cl. ...................................... 358/214; 358/54
[58] Field of Search ............... 358/214, 215, 216, 209, 358/227, 211, 212, 213

[56] References Cited

U.S. PATENT DOCUMENTS

| | | | |
|---|---|---|---|
| 4,205,337 | 5/1980 | Millward | 358/54 |
| 4,275,422 | 7/1981 | Le Couteur | 358/214 |
| 4,346,408 | 8/1982 | Massmann | 358/214 |
| 4,445,139 | 4/1984 | Stemme et al. | 358/214 |
| 4,476,493 | 10/1984 | Poetsch et al. | 358/214 |

Primary Examiner—Forester W. Isen
Assistant Examiner—Robert G. Lev
Attorney, Agent, or Firm—Frishauf, Holtz, Goodman & Woodward

[57] ABSTRACT

Wide screen film frames are scanned in full width and in a first intermediate store a horizontal section of the frame is defined by a read-out start address and expanded by reading out at a lower speed. Only a part of the desired expansion is produced before the picture is stored for interlaced read-out in pairs of television fields. Thereafter the rest of the desired expansion is produced, with a further selection of the portion of each line to be viewed. Varying the read-out start address to shift the section of the picture to be reproduced in television form is done frame by frame in the first store and field by field in the second store and the two shift adjustments can be programmed in combination for smooth transitions.

8 Claims, 6 Drawing Figures

TELEVISION SCANNING OF WIDE FRAME MOTION PICTURE FILMS

This invention relates to an improved method of the kind disclosed in my copending application, Ser. No. 366,935, filed Apr. 9, 1982, now issued as U.S. Pat. No. 4,476,473, the disclosure of which is hereby incorporated by reference, for television scanning of motion picture films of different frame aspect ratios, particularly scanning so-called "Cinemascope" for films for exhibition by television in the usual television format.

The methods described in my copending application have been found capable of improvement with regard to smoothness in the shifting of the field of view across the wide screen film format of the film.

THE INVENTION

It is an object of the present invention to provide picture-accurate shift of the television field of view without noticeable transitions on the picture screen in television reproduction of the scanned films and to make this possible with any convenient film frame rate and any convenient television standards.

Briefly, the wide screen film frames are scanned, as in the case of my aforesaid copending application, line by line, by means of an array of sensors on which the entire width of the film frames are projected with compression of the frames in width, usually by a factor of two. In accordance with the present invention, each motion picture frame is horizontally expanded by a first factor before it is stored in a film frame store from which interlaced television fields are read out and then, after storage in the film frame store, further horizontal expansion is provided.

The expansion ahead of the film frame store is produced by using a first intermediate store in which the full line scans from the film are stored and from which corresponding selected lengths of each line of the frame, beginning at a desired line start address, are read out at a slower picture point rate and the same line scanning rate for writing into the film frame store. Although the second expansion could be conceivably carried out by selection of line portions read out of the film frame store at the same time as interlaced fields are read out of the film frame store, it is preferably performed by reading each interlaced half of the lines constituting a television field successively into a second intermediate store, which operates field by field, and from which correspondingly selected portions of each line of a field are read out at a slower picture point rate and at the same line rate.

The method of the invention has the advantages that shifting of the section of the film frame that is viewed can be done continuously, i.e., without flickering and without breaking up the course of movement in the picture while preserving picture point fidelity.

It is particularly advantageous for the expansion prior to entry into the film frame store to be by a larger factor than the subsequent expansion. In particular, where the width reduction of the original wide screen format from film scanning is by 40% or so of width, it is preferred that the first expansion step should be by a factor of at least 1.5, in the interest of better resolution.

Further advantages are obtainable in controlling shift of the read-out start position in approximately equal steps, so that independently of film frame speed and television standard, a quasi-linear shift of the section of film being viewed is made possible. Further details regarding control of shift of the field of view across a wide screen film are given in connection with the detailed description of the invention that follows.

THE DRAWINGS

The invention is further described by way of illustrative example with reference to the annexed drawings, in which:

FIG. 1 is a circuit block diagram of an apparatus for carrying out the method of the invention, and FIGS. 2a, 2b, 2c, 2d and 2e are a set of diagrams drawn in vertical alignment to illustrate the effect of varying the readout start addresses of the intermediate stores in FIG. 1.

DESCRIPTION OF THE ILLUSTRATED EMBODIMENTS

Figure 1:
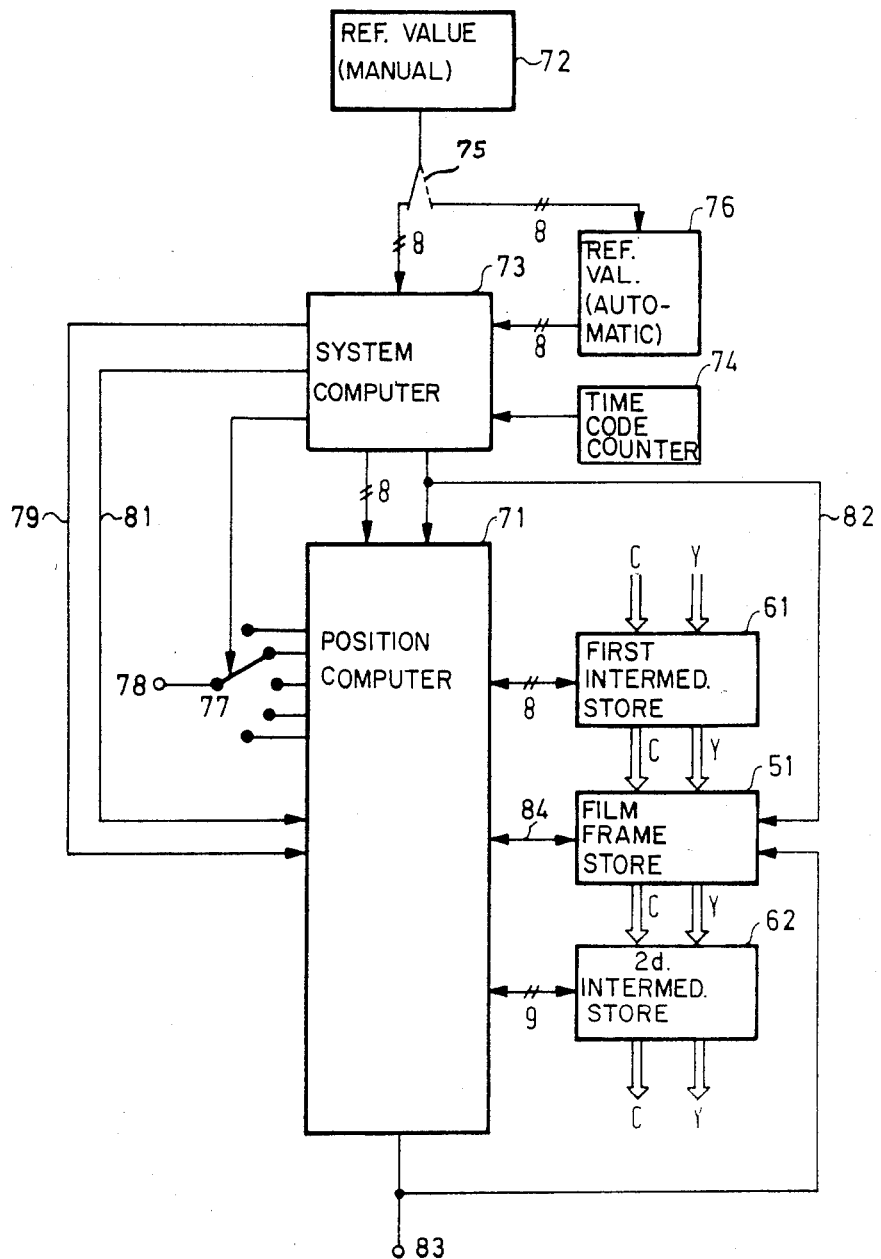

In the circuit of FIG. 1 the horizontal expansion provided for the digitalized videosignals takes place before as well as after the storage of the individual film pictures, known as frames, from which interlaced television fields are produced. The signals C and Y going into the first intermediate store 61 of FIG. 1 are obtained, by means not shown, in the manner described in my aforesaid copending patent application, namely by first obtaining chrominance signals R, G and B from an array of semiconductor sensors on which the frames of a wide format film are successively projected and then converting these chrominance signals in a well-known form of matrix circuit into the luminance signal Y and the ratio C of the two color difference signals R-Y and R-Y. The analog signals C and Y are subjected to analog-to-digital conversion to provide digital C and Y video-signals at the input of the aforesaid intermediate store 61.

In order to provide the necessary picture resolution, the nature of the semiconductor sensors, the constitution of the aforesaid matrix and the sampling rate of the analog-to-digital converter are such that the furnishing of the digital signals by the analog-to-digital converter at the line-scanning rate used in the system corresponds to horizontal compression of the frames scanned on the film almost to half width.

In the first intermediate store 61 a horizontal expansion of the digital videosignals by an expansion factor $K_e$ of, for example, 1.5 takes place in the manner more particularly described below. The videosignals so expanded are then written into a film frame store 51 from which they are furnished in successive pairs of interlaced television fields to a second intermediate store 62 for futher expansion, for example, by the expansion factor $K_e = 1.173$. At the outputs of the second intermediate store 62 expanded video signals C and Y are available which have been expanded by the usually desired overall expansion factor of 1.76 and these video signals are accordingly subjected to digital-to-analog conversion (by means not shown) before further processing.

Of course, the ratio of the two expansion factors given in the above example can also be differently selected according to the particular application and the constitution of the film frame store 51.

The shift of the section of the original film frame that the output signals present for viewing on a television picture screen is produced by means of a position computer 71 which shifts the read-out start positions of the two intermediate stores 61 and 62 with digital commands in 8-bit form for the store 61 and in 9-bit form for the store 62. The multibit connections between the computer 71 and the stores 61 and 62 go in both directions, so that a report-back signals from each store can inform the computer of the read-out start position setting produced by each command and currently controlling operation.

The digitalized d.c. voltage level set by an adjusting knob for shifting the film section to be viewed on a television receiver is provided to the position computer 71 by the manually controlled reference value stage 72 through a second computer 73. The second computer 73 is also supplied with a time code signal (which corresponds to the related film position number) by a time code counter 74. The position value manually set in the reference value stage 72 can be selectively switched over a switch 75 (in its broken line position) through a reference value automation stage 76 by which the shifting of the frame section to be viewed may be preprogrammed as submitted to the second computer 73. The second computer 73, which may be called the system computer, also provides a control signal to a selector switch 77 to the selector arm of which there is provided through the input terminal 78 an operation mode signal, e.g. depending on film format and the particular frame rate in use. The position of the switch 77 selects a connection with one of various inputs of the position computer 71. The second computer 73 also supplies the position computer 71 further signals for control, e.g. forwards and backwards direction (connection 79) and asynchronous or synchronous film frame rate (connection 81). Furthermore, the second computer 73 provides over the connection 82 a write-in start signal both for the film frame store 51 and for the position computer 71. The film frame store 51 as well as the position computer 71, are furthermore, synchronized by a studio synchronism signal applied to the terminal 83. Finally, the film frame store 51 supplies an identification signal to the position computer 71 over the connection 84.

It is now possible by means of the position computer 71, depending upon the above-identified input data, to control the intermediate stores 61 and 62 in such a manner that a horizontal shift of the view frame section can be augmented frame by frame in the intermediate store 61 and field by field in the intermediate store 62. In that manner a shift can be obtained without jerky movement.

Figure 2:
Figure 2B:
Figure 2C:
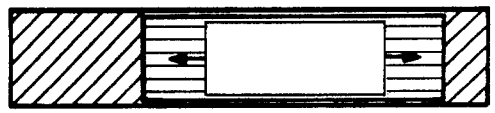

Various possibilities for an optimally raid shift of the film frame section to be viewed can now be explained with reference to FIG. 2, where diagrams represent the use of different read-out start positions of the intermediately stored video signals. The five diagrams of FIGS. 2a–2c are drawn in vertical alignment so that the efffect of shifting the read-out addresses of the intermediate stores may readily be recognized by comparison of diagrams.

The diagonally shaded longest rectangle, upon which other rectangles are superposed, is the complete film frame projected onto the sensors for the scanning operation. The horizontally shaded rectangle of intermediate width superposed on the diagonally shaded rectangle is the portion of the film frame which is read out of the first intermediate store 61 in the form of digital video signals, while the white rectangle superposed on the other two rectangles is the film frame which is read out of the second intermediate store 62 in two interlaced fields of a television picture.

FIG. 2a represents a case of read-out start addresses for selecting the middle of a film frame for reproduction on a television screen. If now, for example, a slight shift of the film frame section being viewed should take place within the shortest time to the left or to the right, only the read-out start position of the intermediate store 62 needs at first to be altered, i.e. the white rectangle shifted position to the left or to the right, as the case may be, within the horizontally shaded rectangle. Only thereafter follows the shift of the read-out start position of the intermediate store 61 by the same amount, so that the reproduced film frame section (white rectangle) finds itself in the middle of the horizontally shaded rectangle, as shown in FIG. 2b for a shift to the left and in FIG. 2c for a shift to the right. This has the advantage that a desired change of position to either side can be carried out at optimum speed.

Figure 2D:
Figure 2E:
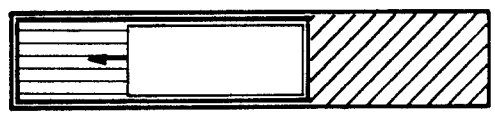

If, however, a greater shift of the film frame portion selected is to take place, first the read-out start position for the first intermediate store 61 should be shifted as far as possible to the desired side (see FIG. 2d) and then the read-out start position of the second intermediate store 62, corresponding to the desired shift, in the maximum case up to the end of the read-out position of the intermediate store 61. If this shift should not be sufficient, then a further shift of the read-out start position of the intermediate store 61 and thereafter of the intermediate store 62 in the same direction should be carried out, until the desired film frame section is reached (see FIG. 2e). These further shifts are produced frame by frame in the intermediate store 61 and field by field in the intermediate store 62. With this last procedure also an optimum utilization of the shift possibilities within the shortest time is accomplished.

Although the invention has been described with reference to a particular illustrative example, it will be understood that variations and modifications are possible within the inventive concept.

We claim:

1. Method of television scanning in television format of wide-field format motion picture films, in which digitalized television signals are produced line by line by means of an array of sensors on which the entire width of the film frames are projected with compression of the frames in width, comprising the steps of:

expanding every motion picture frame horizontally by a first factor by writing said signals for each frame successively into a first intermediate store and reading correspondingly selected portions of each line of said frame out of said store at a slower picture point rate than the writing-in rate without change of line rate;

writing said portions of lines of each frame, read out from said first intermediate store, into a film frame store;

reading a set of lines of said frame store constituting a first of two television interlaced fields out of said film frame store and then performing the same step for the set of the remaining lines of said frame store constituting the second of said two interlaced fields out of said frame store each said set of lines thereby constituting a half-picture field of the same frame;

expanding each said half-picture field horizontally by a second factor after storage of signals in said film frame store by selecting corresponding portions of all lines of each said field and reading said selected line portions of each said field out into an external circuit, and during repeated performance of the foregoing steps, varying from time to time the line portions selected in one or both of the steps in which portions of lines are selected, at intervals not shorter than the frame transfer interval for the first expansion step and at intervals not shorter than the field transfer interval in the case of the second expansion step, for horizontal shift of the picture portion to be reproduced after subsequent readout into said external circuit.

2. Method as defined in claim 1, in which said first factor is greater than said second factor and in which the second expansion step is performed by writing the signals read out from said film frame store as successive interlace fields into a second intermediate store and then reading them out therefrom into an external circuit at a slower picture point rate and at the same line rate.

3. Method as defined in claim 2, in which said first factor is at least 1.5 and the second factor is of a magnitude bringing the product of said factors, which corresponds to the overall expansion produced by the combination of the steps of "expanding" horizontally, into compensation for horizontal compression during film scanning by means of said array of sensors.

4. Method as defined in claim 2, in which the step of varying the selected portions of lines read out of said first intermediate store is performed by a variation of line readout start position by a plurality of picture points at a time and the step of varying the selected portions of read out of said second intermediate store is done by a variation of line readout start position by one picture point at a time.

5. Method as defined in claim 4, in which said steps of varying selected portions of lines to be written in are performed for large variations by producing a succession of steps of smaller substantially equal variations, frame by frame in reading out of said first intermediate store and field by field in reading out of said second intermediate store.

6. Method as defined in claim 3, 4 or 5, in which picture shifts of a magnitude greater than 2 picture points and less than a predetermined magnitude are made by first shifting the readout start position for lines of said second intermediate store and thereafter shifting the readout start position of said first intermediate store by the same number of picture points.

7. Method as defined in claim 3, 4 or 5, in which picture shifts of a magnitude greater than a predetermined magnitude are made by first shifting the readout start position of said first intermediate store and thereafter shifting the readout start position of said second picture store at least once.

8. Method as defined in claim 2 or 3, in which the step of varying the selection of line portions is accomplished by varying readout start positions in said first and second intermediate store by operation of a control (72) that translated desired picture margin values into readout start addresses for storage in a microcomputer (71) for control of readout from said first and second intermediate stores (61,62).

* * * * *